United States Patent [19]

Hamilton et al.

[11] Patent Number: 4,872,841
[45] Date of Patent: Oct. 10, 1989

[54] DEMONSTRATION DEVICE FOR ILLUSTRATING SPINAL MISALIGNMENT

[76] Inventors: Kenneth L. Hamilton, 22706 Gordon Switch, St. Clair Shores, Mich. 48081; Timothy C. Butler, 2929 Acorn La., Howell, Mich. 48843

[21] Appl. No.: 208,680

[22] Filed: Jun. 20, 1988

[51] Int. Cl.[4] ............................................. G09B 23/32
[52] U.S. Cl. .................................................. 434/274
[58] Field of Search ................ 434/274, 275; 200/158, 200/275

[56] References Cited

U.S. PATENT DOCUMENTS

| | | | |
|---|---|---|---|
| 2,103,021 | 12/1937 | Salsman | 434/274 |
| 2,197,975 | 4/1940 | Fleet | 434/274 |
| 2,525,743 | 10/1950 | White | 200/275 |
| 2,537,573 | 1/1951 | Conschafter | 434/274 |
| 3,762,070 | 10/1973 | Culver | 434/274 |
| 4,350,490 | 9/1982 | Sandegård | 434/274 |
| 4,713,506 | 12/1987 | Klink | 200/158 |

Primary Examiner—Edward M. Coven
Assistant Examiner—Valerie Szczepanik
Attorney, Agent, or Firm—Basile and Hanlon

[57] ABSTRACT

A demonstration device for illustrating spinal injury utilizing a demonstration model of a portion of a human spine in which visual electronics have been applied through the use of light emitting diodes to show the interruption of nerve signal flow upon the dislocation of the vertebrae bones with relation to one another. The device includes an electric circuit, battery, and a switch which operate upon rotation of the model to change the rate of flash of light emitting diodes thus indicating a change in nerve frequency due to injury.

8 Claims, 3 Drawing Sheets

DEMONSTRATION DEVICE FOR ILLUSTRATING SPINAL MISALIGNMENT

BACKGROUND OF THE INVENTION

1. Field of the Invention

The present invention is concerned with an educational display device useful as a representation of the effect of a misalignment of a spine bone on nerve signals within the spinal cord.

2. Description of the Relevant Art

Display devices generally available to the medical profession resemble the structure of human bones and show their relationship to one another. Devices of this type can be utilized to indicate the position of the spinal cord upon misalignment, but are of little assistance in indicating the effect of such positional change on other bodily functions such as nerve signals traveling through the nerve trunk of the spinal cord. The present invention is directed to a display device which includes the use of visual electronics to show the interruption of nerve signal flow upon the occurrence of the dislocation of spinal bones with relation to one another. The device assists those in the medical profession to better describe such activity or reduced activity to a lay person.

SUMMARY OF THE INVENTION

In accordance with the present invention, a demonstration device for illustrating spinal problems comprises a spinal column model with a first vertebrae or neckbone optionally attached to a hollow display base, a second upper vertebrae mounted vertically above the first vertebrae and movably associated with the first vertebrae and, optionally, attached to the display base. In the first embodiment, attachment is achieved through the use of a shaft extending from the display base through the first vertebrae and into the second vertebrae, a flexible rubber disk disposed between the first and second vertebrae, a flexible nerve trunk mounted to run throughout the vertebrae with a hollow portion to allow the insertion of a wiring harness, a wiring harness mounted within the flexible nerve trunk and extending from the display base to the end or ends of the nerve trunk, at least one light emitting diode connected to the wiring harness in the nerve trunk and protruding from the nerve trunk to be visible when lit, a circuit mounted in the display base connected to the light emitting diode by way of the wiring harness and switchable to flash at more than one rate, and a power switch mounted on the exterior of the display base to activate the circuit.

In the second embodiment, a flexible cord extends through suitable apertures prepared in the bones elastically connecting the bones to each other. This embodiment also includes a flexible nerve trunk mounted to run through the vertebrae with a hollow portion to permit insertion of a wiring harness. In this embodiment, the wiring harness extends from a suitable energy source mounted in either the optional display base or contained within the spinal bone.

The device which incorporates a spinal column model which is optionally mounted on an electronics project box which serves a twofold purpose of a display base for the bone structure and a housing for an electric circuit, battery and switch which operates the display function of the model.

The display operates such that when the spinal bones are in their normal alignment, the light emitting diode indicators built into the nerve endings flash at a first frequency. When the bones are twisted out of their normal alignment, thus simulating injury, the light emitting diode indicators are switched to a different circuit so as to flash at a second, frequency, showing abnormal nerve operation due to misalignment.

In the first preferred embodiment, demonstration of the device which allows misalignment of the vertebrae to switch circuits is a bolt and wire switch which consists of a connecting member with a large slot in the head, in which is positioned a wire which does not contact either side of the slot unless the connecting member is rotated. Upon rotation, the wire connects one side of the slot and completes a circuit which changes the frequency of light emitting diode flash rate. Alternatively, an optical detector and emitter can be so mounted on appropriate vertebrae so as to face each other when the bone members of the display device are in the aligned position. Feedback from emitter to detector triggers the light emitting diodes to flash at a first frequency. Movement of the bones from their aligned position causes a change in signal and causes the light emitting diodes to flash at a second, different frequency.

Other objects and features of the invention will become apparent by reference to the following specification and to the drawings.

BRIEF DESCRIPTION OF THE PREFERRED EMBODIMENT

Figure 1:
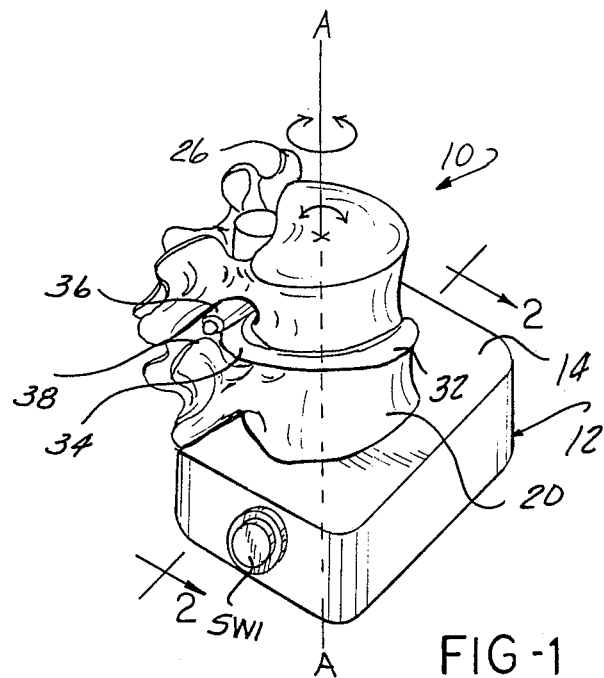
FIG. 1 is a perspective view showing a present invention and indicating various degrees of movement of the device.
Figure 2:
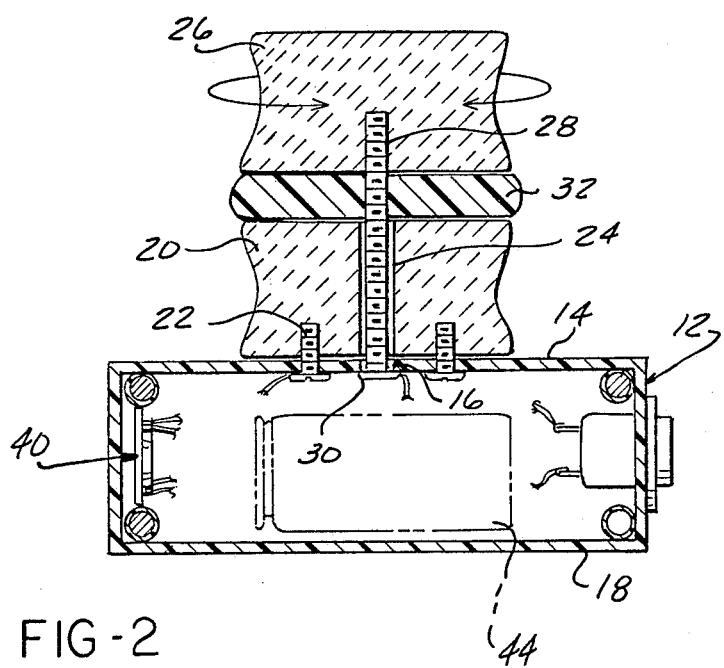
FIG. 2 is a front section taken on line 2—2 of FIG. 1 of the display device.

In FIG. 1 there is shown one typical example of the display device designated generally 10 of the present invention. The display device 10 is provided with an optional hollow display base 12 having a top surface 14, in which an aperture 16, see FIG. 2, is formed in the center thereof. Additionally, the display base 12 has a removable bottom 18.

A first lower member 20, configured to resemble a bone member of a vertebrae, is fixedly attached to the top surface 14 of the display base 12 utilizing fixing means such as screws 22. A hollow shaft 24 is formed in the center of the first lower member 20 and is in alignment with the aperture 16 in the top surface of the display base 12 when the first lower member 20 is mounted upon the display base 12.

A second upper member 26, also configured to resemble a bone member of a vertebrae is rotatably mounted to the display base 12, at a position vertically above the first lower member 20, by shaft connecting means 28 passing from the inside of the display base 12 through the aperture 16 in the top surface 14 of the display base, through the hollow shaft 24 of the first lower member 20, and into the second upper member 26. The shaft connecting means is retained within the display base by a flanged head 30 which contacts the underside of the top surface 14 of the display base 12. By mounting member 26 in this manner, member 26 is movable relative to fixed member 20, generally about axis A—A.

A flexible rubber-like member 32, which is configured to resemble a disc, is disposed between the first lower member 20 and second upper member 26, and acts as a cushion between the surfaces of the bones during movement relative to one another. The disc 32 may have an area of discoloration 34 which indicates injury to the disk.

A flexible member 36, configured to resemble a nerve trunk, is mounted to run throughout passages in the first and second vertebrae members 20 and 26, respectively. Disposed within the flexible nerve trunk member 36 is a wiring harness 58 which is mounted to run from within the display base 12, through the flexible nerve trunk member 36, and to at least one end of said member.

At least one light emitting diode 38 is fixed to the end of the wiring harness 58 remote from display base 12. The light emitting diode 38 protrudes from at least one end of the flexible nerve trunk member 36 so as to be visible when lit.

Circuit means, designated generally 40, mounted within the hollow display base 12 is provided for operating the light emitting diode 38 in an ON/OFF configuration indicating the flow of nerve signals within the nerve trunk 36. The circuit means 40 is provided with a switching means, described in further detail below, for varying the frequency at which the light emitting diodes flash dependent upon the position of the first lower member 20 and the second upper member 26 in relation to one another. A second switch means SW1, fixedly attached to an exterior surface of display base 12, is provided for activating circuit means 40.

Figures 4, 5:
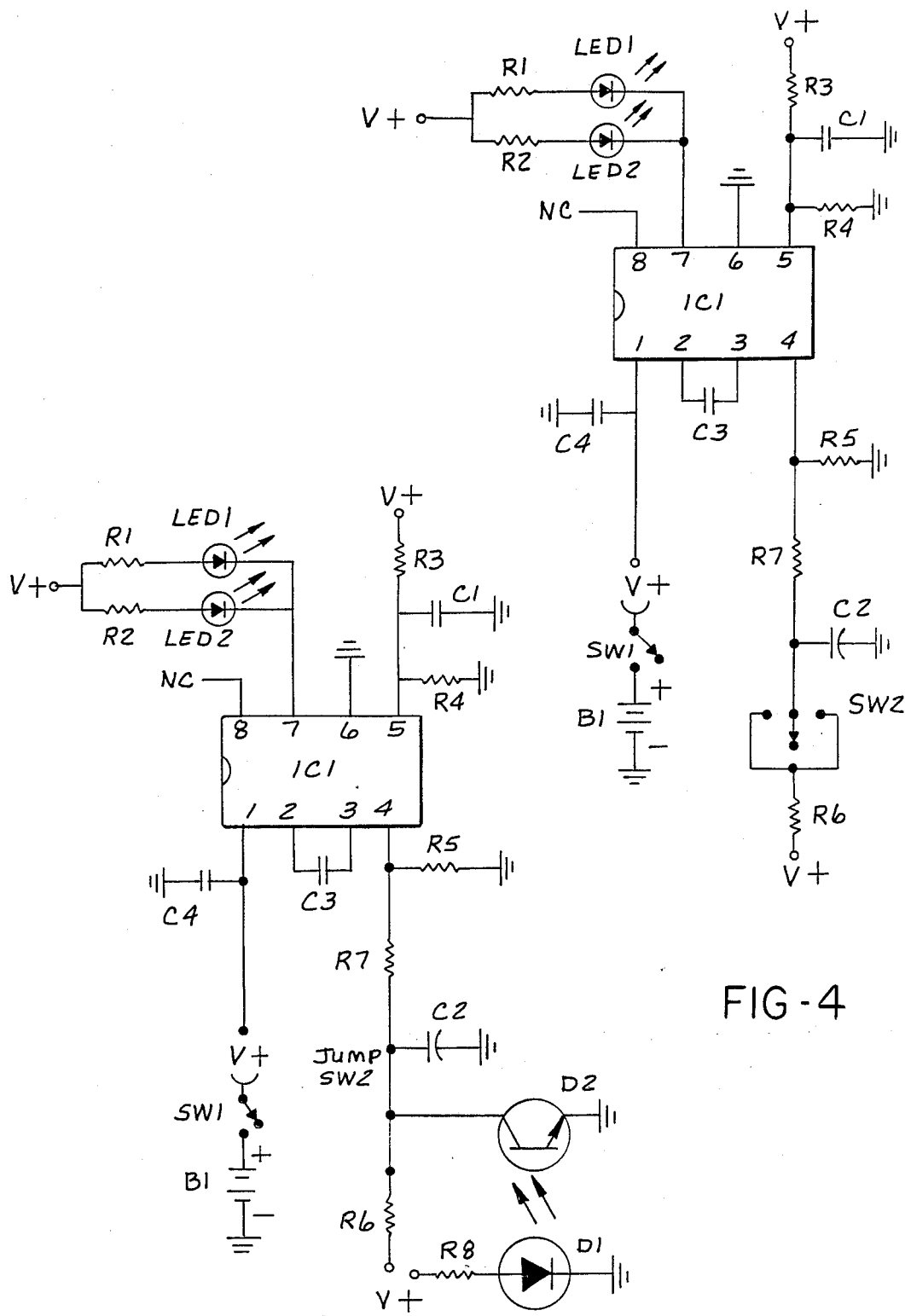
FIG. 4 is a schematic of a circuit which may be employed in the first embodiment of the present invention.
FIG. 5 is a schematic drawing of a circuit which may be employed in the second embodiment of the present invention.

In a preferred embodiment, circuit means 40, see FIG. 4, is a voltage controlled oscillator operating at a rate between 4 and 12 Hz. The operating voltage is applied by a standard rectangular 9-volt battery 44 through pin 1 of an XR2209 precision oscillator. Switch SW1, a momentary push switch, supplies the battery power to pin 1. C4 is a bypass capacitor on the supply line which determines the lower cut-off frequency of the circuit. The capacitor C3 is also a frequency determining component which determines the normal rate of flashing of the light emitting diodes. LED1 and LED2. The high frequency (12 Hz) end of the flash rate is set by resistor R5 while R6 sets the low frequency (4 Hz) flashing rate. The low frequency resistor R6 is only engaged when switch means SW2 is shifted to include resistor R6 in the circuit. This shift occurs when the second upper member 26 is moved out of alignment with the first lower member 20. Shifting switch SW2 causes voltage to be applied at pin 4 of the XR2209 precision oscillator chip. The oscillation of resistor R7 and capacitor C2 slows the rate of change of the oscillator as charge build-up occurs in C2.

Consequently, a high frequency flashing rate occurs when the vertebrae is aligned and a low frequency flashing rate occurs when the vertebrae is misaligned so as to shift switch SW2 into engagement.

Figure 3A:
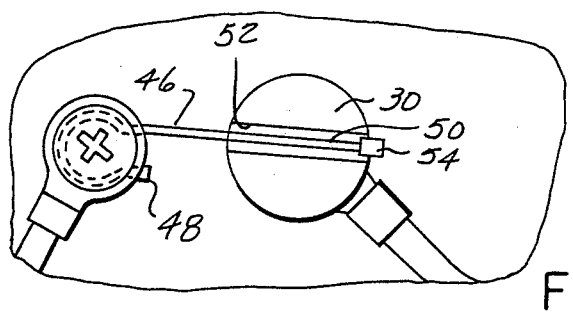
FIG. 3A is a schematic of the bolt and wire switching device which may be employed in the present invention.
Figure 3B:
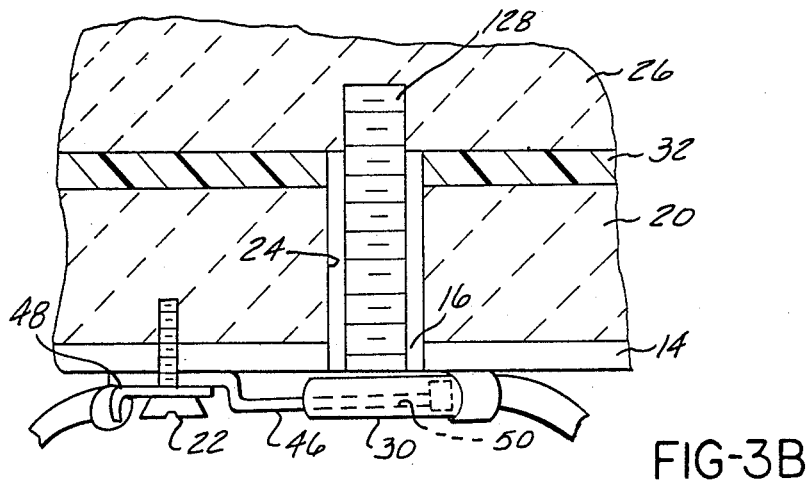
FIG. 3B is a side view of the bolt and wire switching device of FIG. 3A.

In a first preferred embodiment, switch SW2, see FIGS. 3-A and 3-B, comprises a wire member 46, which is disposed within the hollow display base 12, having a first end 48 fixedly attached to the inside of the top surface 14 of the display base 12, preferably by a fixing screw 22. The second unfixed end 50 is configured so as to pass through a slot 52 in the flanged head of the shaft connecting means 28. Insulating means 54 are attached to a portion of the second end 50 of the wire member 46 at a position where the wire passes through slot 52. The insulating means 54 contacts the side walls of slot 52 so as to bias the wire member 46 into the center, and away from the sides, of the slot. In this configuration, wire member 46 remains out of contact with the sides of slot 52 when the upper and lower members 20 and 26, respectively, are in their normal aligned position. When the second upper member 26 is misaligned relative to the first lower member 20, the flanged head portion 30 of shaft connecting means 28 is misaligned relative to the fixed wire member 46 and, as such, the sides of slot 52 contact wire member 46 at an uninsulated portion 56 of the wire, thereby actuating switch SW2 and changing the frequency of flashing of the light emitting diodes 38.

Thus, the display device operates such that when the first lower vertebrae member 20 and second upper vertebrae member 36 are in a normal alignment, the light emitting diode indicators built into the nerve endings flash at a first frequency and, when the first and second vertebrae members are misaligned, the light emitting diode indicators are switched to a different circuit through the operation of switch SW2, to flash at a second lower frequency showing a reduced nerve operation due to the misalignment.

Figure 6:
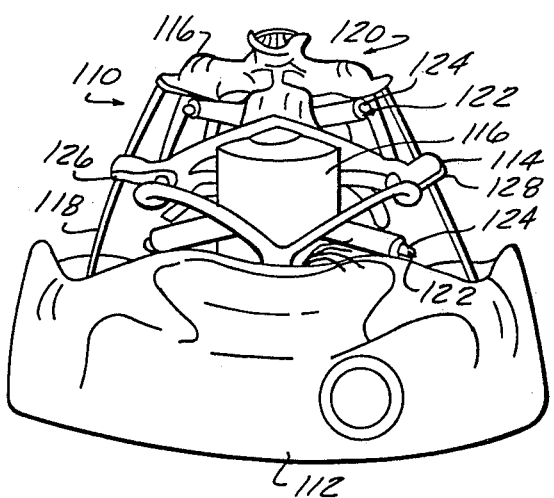
FIG. 6 is a front view of the demonstration device depicting the second embodiment of the present invention.
Figure 7:
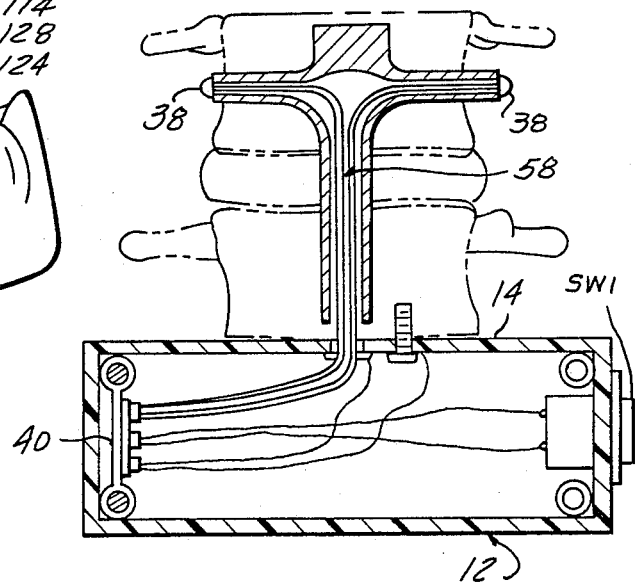
FIG. 7 is a cross-sectional view of the flexible member and display base of the present invention with the wiring harness mounted therein, and the upper and lower members shown in phantom.

An alternate embodiment is shown in FIGS. 5 and 6 which show a display device 110. The display device 110 includes at least a first and a second member 112 and 114 configured as a vertebrae, the base of the skull, etc. As depicted in FIGS. 5 and 6, there is also a third member 116. In this embodiment, the members 112, 114 and 116 are secured to each other by a suitable elastic securing means, such as an elastic cord 118 which extends through prepared apertures extending through each vertebrae (not shown). Preferably, at least two apertures are prepared in each member with a single elastic cord 118 extending therethrough and fastened to permit movement of the members which simulates movement of the base of the skull and neck.

A flexible member 120, configured to resemble a nerve trunk, is mounted to run through central passages in the first, second and third members 112, 114 and 116, respectively. Disposed within the flexible nerve trunk member 120 is a wiring harness (not shown) which is connected to the power and control source, through the flexible nerve trunk member 120 and to at least one end 122 of said member.

At least one light emitting diode 124 is fixed to the end of the wiring harness remote from the power source. The light emitting diode 124 protrudes from an associated end 122 of the flexible nerve trunk member 120 so as to be visible when lit.

The power source and appropriate circuit means may be mounted in a suitable display base (not shown) or contained within one of the bone-like members 112, 114, 116. Circuit means permit operation of the light emitting diode 124 in an ON/OFF configuration indicating the flow of nerve signals within the nerve trunk 120. Positioned on the members 112 and 114, respectively, are the emitter 126 and detector 128 of an optical couple assembly. Detector 128 and emitter 126 are positioned such that the line of sight is open when the vertebrae members 112, 114, 116 are in the appropriate aligned position. When the members are misaligned in relation to one another, the optical circuit is broken which triggers switching from the first ON/OFF frequency to a second frequency.

While the embodiments of the invention has been described in detail above in relation to a demonstration device for illustrating spinal problems, it will apparent to those skilled in the art that the disclosed embodiment may be modified, therefore the foregoing description is to be considered exemplary rather than limiting, and the true scope of the invention is that defined in the following claims.

What is claimed is:

1. An education display device, representing a portion of a spine, useful for illustrating the effect of a misaligned spine vertebrae on the operation of a nerve trunk disposed within the spine, said device comprising:

a first lower member configured to resemble a vertebrae;

a second upper member configured to resemble a vertebrae, movably mounted above said first lower member;

means for movably mounting said second upper member above said first lower member;

a flexible member configured to resemble a nerve trunk, mounted in side-lying anatomically appropriate relationship with said vertebrae;

a power source;

a wiring harness, having first and second ends, mounted with said flexible member, extending from said power source through said flexible member to at least one end of said flexible member;

at least one light emitting diode fixed to said first end of said wiring harness remote from said power source, and protruding from said flexible member proximate to the first lower member and second upper member;

circuit means, mounted within a unitary hollow display base, for operating said light emitting diode in an ON/OFF configuration at a frequency which varies depending on the position of said first and second members in relation to each other, and connected to said second end of said wiring harness;

a first switching means attached to said first and second members operating to switch said circuit means from one frequency of ON/OFF operation to a second frequency of ON/OFF operation dependent upon the position of said first and second members in relation to each other;

second switching means attached to an exterior surface of said base for activating said circuit means;

wherein movement of the first and second members with relation to one another will change the frequency of ON/OFF flashing of the light emitting diode visually indicating the interruption of nerve signal flow which occurs upon dislocation of spinal bones with relation to one another.

2. The apparatus of claim 1, further comprising:

a slot head screw passing through and rotatable relative to a hollow shaft located in said first member and an aperture located in the unitary display base, said slot head screw fixedly attached to said second member;

wherein said slot head screw allows said second member to be rotated relative to said first member.

3. The apparatus of claim 1 wherein the unitary display base comprises:

a plurality of sides;

a top surface with an aperture passing therethrough, the top surface angularly attached to said side surfaces, said first member permanently attached thereon; and a removable bottom;

a shaft connecting means passing from the inside of said unitary display base through said aperture in said top surface, the shaft adapted to be received within a hollow shaft in said first member and fixed attached to said second upper member.

4. The apparatus of claim 3 further comprising:

a slot head screw slightly smaller in diameter and passing through said aperture and shaft in said first member;

wherein the slotted head is flush with the interior said of said top surface of said base and the mounting allows the second member to be rotationally moved relative to the first member.

5. The circuit means of claim 4 wherein said first switching means further comprises:

a wire member, disposed within said hollow display base, having a first end fixedly attached to the inside of said top surface of said base, and having a second unfixed end configured so as to pass through the slot in the head of said slot head screw of said shaft connecting means;

insulating means attached to a portion of said second end of said wire, where said wire passes through said slot, and contacting the sides of said slot so as to bias said wire away from the sides of said slot for isolating said wire from said slot when said shaft connecting means is in a position corresponding to an unturned position of said second upper member;

means for connecting said first end of said wire and said slotted bolt into said circuit means;

wherein in a first unturned position of said second upper member relative to said first lower member, said wire is isolated from said slot in said slotted bolt thereby maintaining an open circuit and;

wherein when said second upper member is rotated relative to said first lower member, said slotted bolt, integral with said second upper member, is rotated such that the sides of said slot contact said wire member in a position where said wire member is not insulated, thereby closing said switching means and actuating electrical means attached to said first end of said wire member and said slotted bolt;

wherein actuation of said electrical means operates to change the frequency of said ON/OFF operation of said, at least one, light emitting diode.

6. The apparatus of claim 1 further comprising:

a flexible rubber-like member configured to resemble a disc and mounted between said first and second members in approximate anatomically correct orientation thereto.

7. The apparatus of claim 1 wherein said first and second vertebrae are movably connected to one another by an elastic member extending through a series of apertures positioned in said vertebrae.

8. An education display device, representing a portion of a spine, useful for illustrating the effect of a misaligned spinal vertebrae on the operation of a nerve trunk disposed within the spine, said device comprising:
- a hollow display base having sides, a top surface with an aperture passing therethrough and a removable bottom;
- a first lower member configured to resemble a vertebrae fixedly attached to said display base by fixing means, and having a hollow shaft passing vertically therethrough in alignment with the aperture in said top surface of said display base;
- a second upper member configured to resemble a vertebrae rotatably mounted to said base, in vertical alignment, above said first lower member, by a slot head screw slightly smaller in diameter and passing through, said aperture in said display base and shaft in said first member, from the inside of said hollow display base through said aperture in said top surface and said shaft in said first lower member and into the second upper member;
- a third flexible rubber-like member, configured to resemble a disk and mounted between said first and second members;
- a fourth flexible member, configured to resemble a nerve trunk, mounted to said vertebrae;
- a wiring harness, having first and second ends, mounted within said fourth flexible member, extending from within said mounting base through said fourth flexible member to at least one end of said fourth member;
- at least one light emitting diode fixed to said first end of said wiring harness remote from said base, and protruding from said fourth flexible member;
- circuit means, mounted within said hollow display base, for operating said light emitting diode in an ON/OFF configuration at a frequency which varies depending on the position of said first and second members in relation to each other, and connected to said second end of said wiring harness;
- a first switching means attached to said first and second members comprising:
- a wire member, disposed within said hollow display base, having a first end fixedly attached to the inside of said top surface of said base, and having a second unfixed end configured so as to pass through the slot in the head of said slot head screw of said shaft connecting means;
- insulating means attached to a portion of said second end of said wire, where said wire passes through said slot, and contacting the sides of said slot so as to bias said wire away from the sides of said slot for isolating said wire from said slot when said shaft connecting means is in a position corresponding to an aligned position of said second upper member;
- means for connecting said first end of said wire and said slotted bolt into said circuit means;
- wherein in a first aligned position of said second upper member relative to said first lower member, said wire is isolated from said slot in said slotted bolt thereby maintaining an open circuit and;
- wherein when said second upper member is rotated relative to said first lower member, said slotted bolt, integral with said second upper member, is rotated such that the sides of said slot contact said wire member in a position where said wire member is not insulated, thereby actuating said electrical means attached to said first end of said wire member and said slotted bolt;
- wherein actuation of said electrical means operates to change the frequency of said ON/OFF operation of said, at least one, light emitting diode;
- a second switching means attached to an exterior surface of said base for activating the circuit means;
- wherein movement of the first and second members with relation to one another will change the frequency of ON/OFF flashing of the light emitting diode, visually indicating the interruption of nerve signal flow which occurs upon dislocation of spinal bones with relation to one another.

* * * * *